June 30, 1959  D. W. R. WALKER  2,892,433
FLOATING STRUCTURES
Filed April 18, 1955

INVENTOR
Derek W. R. Walker
BY
Ralph B. Stewart
ATTORNEY

United States Patent Office 2,892,433
Patented June 30, 1959

2,892,433

FLOATING STRUCTURES

Derek William Ross Walker, Birmingham, England

Application April 18, 1955, Serial No. 502,100

Claims priority, application Great Britain April 20, 1954

1 Claim. (Cl. 114—43.5)

The present invention relates to floating structures such as may be used, for example, for bridging rivers, or for providing over sheets of water floating airstrips for aircraft, jetties, playing fields or the like.

The invention is particularly, although not exclusively, concerned with floating structures that have a small vertical depth and shallow draught and has for its principal object to provide structures of this kind which are relatively light and simple, which are built up of components which are themselves light and easily transported and are of a small number of different standard forms, and which can readily be assembled and dismantled, if necessary on water.

According to the present invention there is provided a floating structure comprising two sets of elongated, substantially rigid members, the members of both of the sets being buoyant, the members of one set being slidable in, and passing through, transverse apertures in the members of the other set, thereby preventing longitudinal displacement of the members of said other set, and means for preventing longitudinal displacement of the members of said one set. Members may be of buoyant material, such as timber, or they may be in the form of casings, such as tubes, of metal, plastic or other material, rendered buoyant by filling them with a buoyant material, such as a foam rubber in which a relatively large volume of air (or other gas) is entrapped, the rubber being preferably treated to render it relatively inflexible and to reduce its weight. An example is the substance sold under the registered trademark "Onazote." Alternatively the tubes may be hermetically sealed and filled with a gaseous buoyant material such as air. However an advantage of using a buoyant material of the solids type, such as the foam rubber, is that puncturing of the tube containing the material does not destroy the buoyancy.

Figure 1:
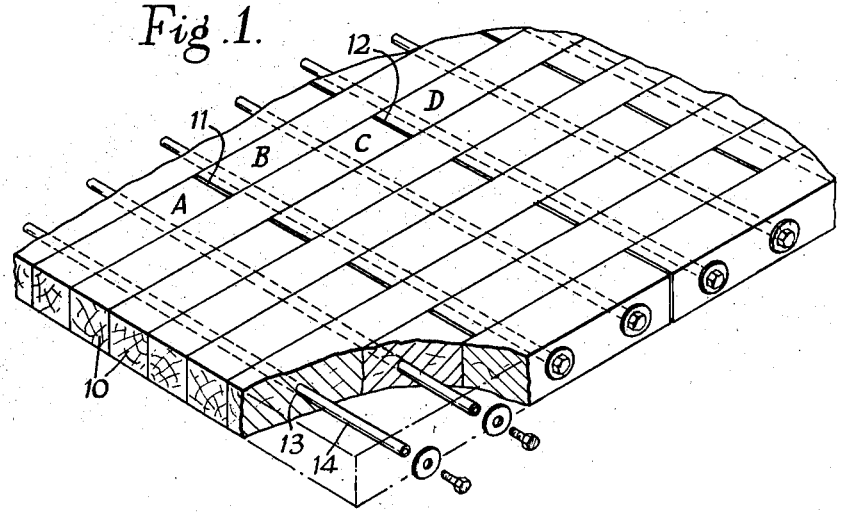
Figure 2:
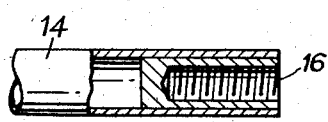
Figure 3:
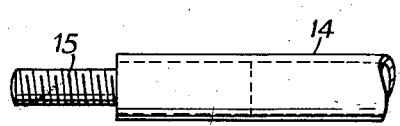
Figure 4:
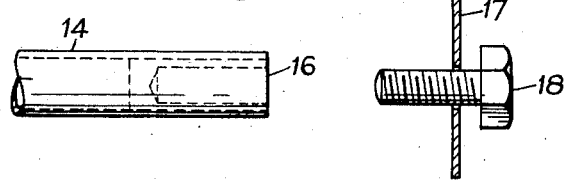

The invention will be described by way of example with reference to the accompanying drawings in which Fig. 1 is a perspective view of a part of one embodiment of the invention, Figs. 2 and 3 show respectively opposite ends of a transverse member in Fig. 1, Fig. 4 shows end-securing means for a transverse member in Fig. 1.

Referring to Figs. 1 to 4, a floating structure suitable for a helicopter landing platform and for other purposes comprises a plurality of elongated, substantially rigid, buoyant members 10 laid side by side and end to end to form a platform. The members 10 may be hollow tubes filled with buoyant material but, as illustrated, are in the form of buoyant timber baulks. The joints 11 and 12 between laterally adjacent pairs of members such as A, B and C, D are offset or staggered relatively to one another. Each member 10 is provided with at least four transverse apertures 13, the apertures in each member being in register with apertures in members on either side thus forming a number of aligned sets of apertures. Through each such aligned set of apertures is passed a transverse, elongated, buoyant substantially rigid member 14. Each member 14 has at one end a male locking member 15 adapted to be engaged in, and to lock to, a female member 16 at the opposite end of an abutting lateral member. In this way the length of the transverse members can be increased to any desired extent. The male and female members are in this example shown as screw-threaded. Means are provided for securing the ends of the outermost transverse members to prevent their longitudinal displacement. These means comprise, for one end, as shown in Fig. 4, an apertured plate 17 with a bolt 18 passing through the plate and adapted to be screwed into the female locking member 16. For the other end the said means comprise a plate (not shown) provided with a threaded aperture adapted to be screwed, as a nut, over the male locking member 15.

The number of components of different form required in this embodiment is only four: namely the apertured members, the transverse members, and the male and female locking means.

When additional buoyancy is required, the raft formed as described may be covered over its lower surface with buoyant waterproof material as already described.

The purpose of providing at least four apertures 13 traversed by transverse members 14 in each member 10 will be understood from the following. Two members 14 traversing members B and C provide a substantially rigid coupling between these members. Two members 14 traversing members A and C provide a substantially rigid coupling between these members. There is, therefore, also provided a substantially rigid coupling between A and B, and so on.

I claim:

A floating structure comprising a plurality of elongated, substantially rigid, buoyant members laid side by side and end to end to form a platform, with the joints between the abutting ends of laterally adjacent pairs of members offset relatively to one another, each said member being apertured to provide at least four transverse apertures therein located in register with apertures in members on either side to form an aligned set of apertures, a transverse, elongated, substantially rigid member slidable through and located in each aligned set of apertures, and detachable means preventing displacement of the transverse members in the direction of their length, each transverse member being hollow and of uniform cross-section throughout its length and having buoyant material sealed therein to render it buoyant and allow assembly of the members while floating on the water, each transverse member having at one end a male locking member and at the opposite end a female locking member, adapted to make locking engagement with said male locking member of an adjacent transverse member, whereby the length of transverse members can be increased.

References Cited in the file of this patent

UNITED STATES PATENTS

| 970,172 | Bloom et al. | Sept. 13, 1910 |
| 1,205,667 | Rubenstein | Nov. 21, 1916 |
| 1,368,935 | Janecek | Feb. 15, 1921 |
| 1,825,195 | McAvoy | Sept. 29, 1931 |
| 1,867,507 | Harris | July 12, 1932 |
| 1,873,197 | Harris | Aug. 23, 1932 |
| 2,291,712 | Hatton | Aug. 4, 1942 |
| 2,466,613 | Richardson | Apr. 5, 1949 |
| 2,527,595 | Hamilton | Oct. 31, 1950 |